Figure 4:
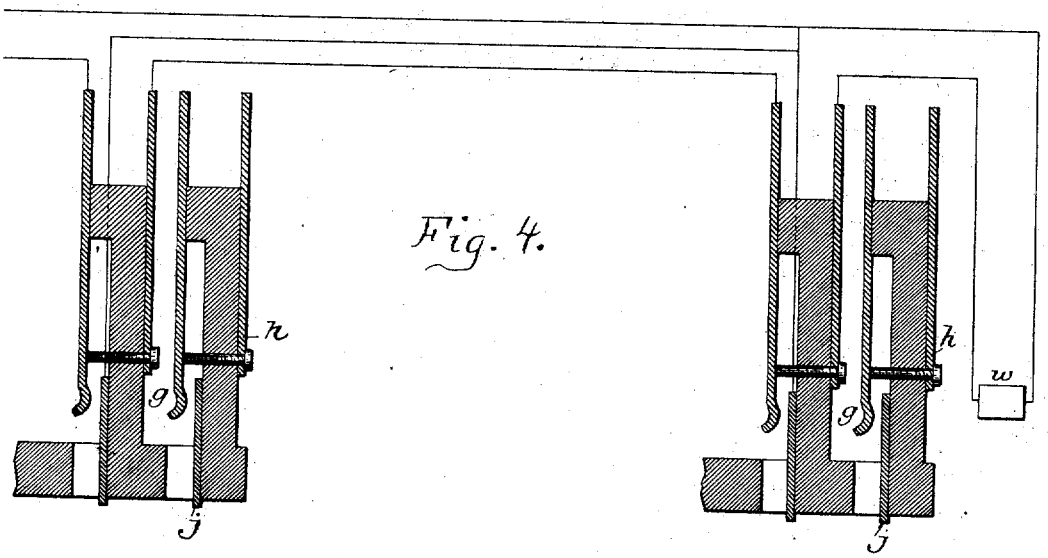

2 Sheets—Sheet 1.
M. G. KELLOGG.
MULTIPLE SWITCHBOARD.
No. 11,387. Reissued Nov. 14, 1893.
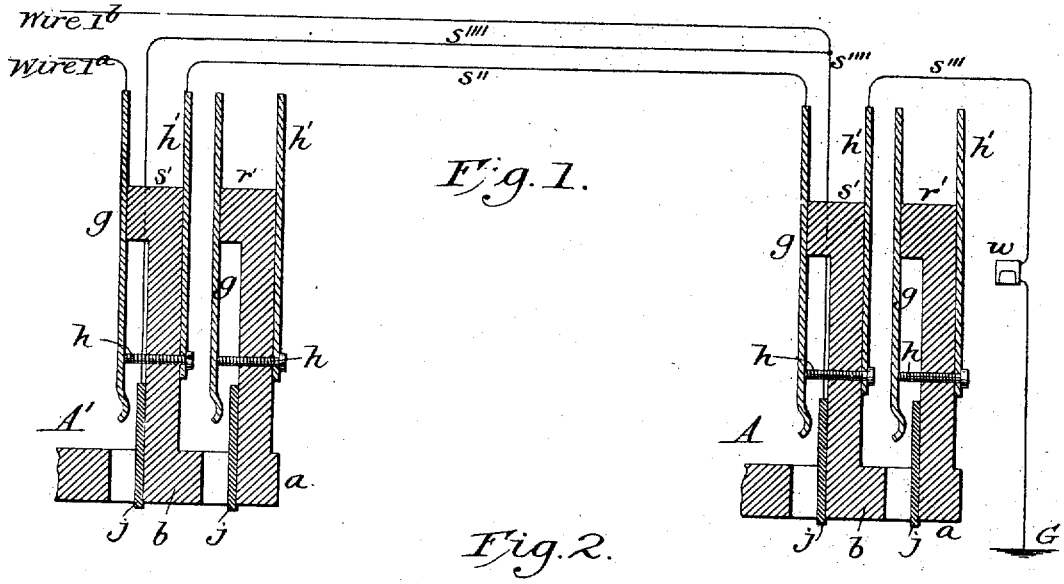
Fig. 1.
Fig. 2.
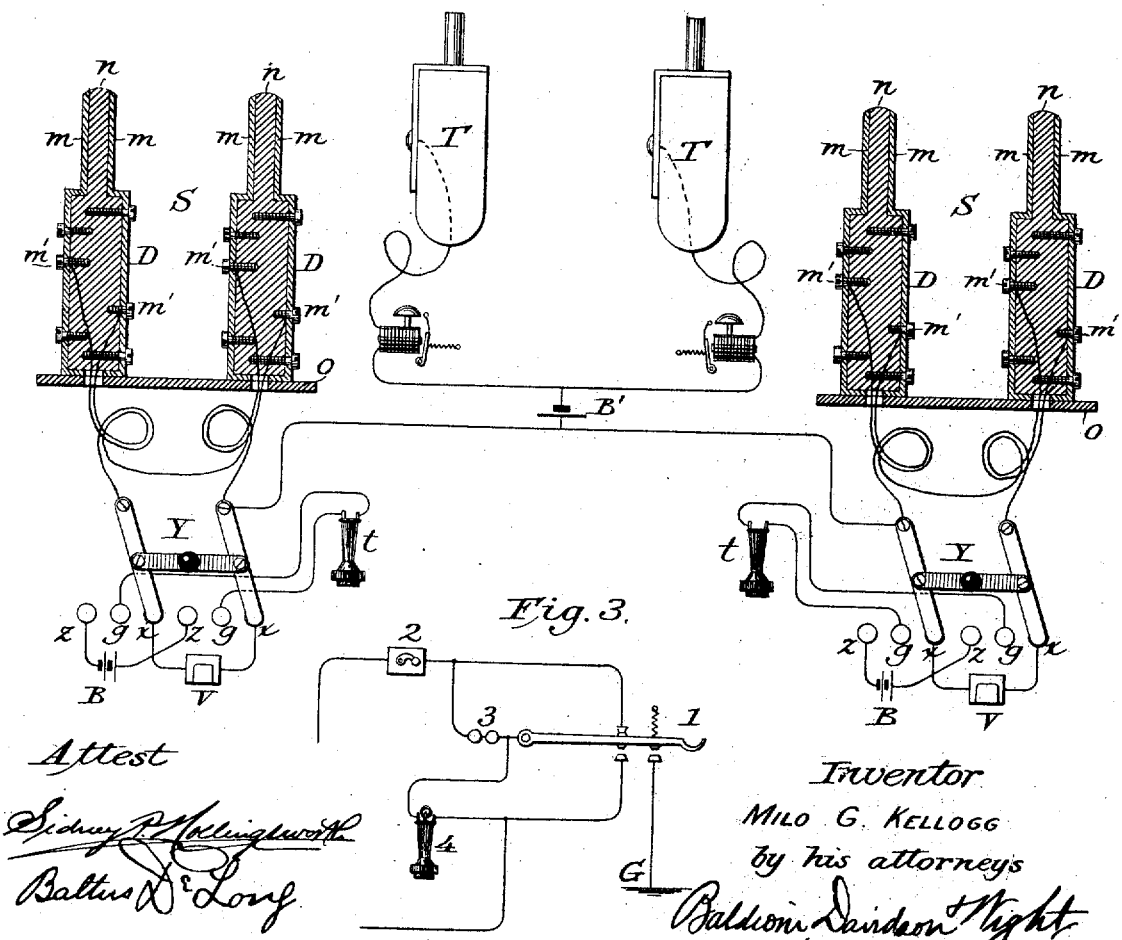
Fig. 3.
Attest
Sidney P. Mellinghouse
Baltus & Long
Inventor
Milo G. Kellogg
by his attorneys
Baldwin, Davidson & Wight 2 Sheets—Sheet 2.

M. G. KELLOGG.

MULTIPLE SWITCHBOARD.

No. 11,387. Reissued Nov. 14, 1893.

Witnesses:
Catharine Georgi
Therese Walsh

Inventor:
Milo G. Kellogg
by his Attorneys
Baldwin, Davidson & Wright

UNITED STATES PATENT OFFICE.

MILO G. KELLOGG, OF CHICAGO, ILLINOIS.

MULTIPLE SWITCHBOARD.

SPECIFICATION forming part of Reissued Letters Patent No. 11,387, dated November 14, 1893.

Original No. 388,052, dated August 21, 1888. Application for reissue filed January 8, 1891. Serial No. 377,180.

*To all whom it may concern:*

Be it known that I, MILO G. KELLOGG, of Chicago, in the county of Cook and State of Illinois, have invented certain new and useful Improvements in Multiple Switchboards for Telephone-Exchanges, of which the following is a full, clear, concise, and exact description, reference being had to the accompanying drawings, forming a part of this specification.

My invention relates to a telephone-exchange system in which the subscribers' lines are metallic circuits; and it consists of apparatus for and a system of testing at any board of the exchange to determine whether any line is in use at another board.

In the accompanying drawings, illustrating my invention: Figure 1 is a diagram illustrating the main-line switch-board apparatus and circuits. Fig. 2 shows a diagram of two operators' cord systems for receiving and answering calls at two boards, switching and clearing out subscribers' lines and for testing to determine whether a line is in use. Fig. 3 shows a diagram of the connections of the subscribers' station apparatus. Fig. 4 shows a modification of the main switch board and circuits.

In the drawings like parts and apparatus are indicated by the same letters of reference.

In Fig. 1, A is a sectional view of one switch-board, and A′ is a sectional view of another switch-board to which the same lines are connected. I place as many boards at the office as are found necessary or desirable in order to properly answer the calls and make the connections. On each board is a spring-jack or other suitable switch for each line. Each spring-jack has a contact-spring, which normally bears on an insulated contact-point and has another contact-piece insulated from the rest of the apparatus (except by line connections) and is adapted to receive a loop-switch plug, and when the plug is inserted to disconnect the spring from the contact-point (on which it normally rests) and connect the contact-pieces of the plug with the contact-spring and said contact piece of the switch, respectively.

In the drawings $g$, $g$ represent the springs of the different switches, $h$, $h$ the contact-points and $j$, $j$, the contact-pieces.

The plugs D, D, (shown in Fig. 2) when inserted operate the switches, as above described.

The contact-pieces $j$, $j$ should be so placed that a test-plug or other switch-testing device may be readily connected with them.

$a$, $b$, represent the rubber strips on which the metal parts of the switches are mounted, as shown.

$r'$, $r'$, and $s'$, $s'$ are the switches for two lines.

$w$ is a calling-annunciator and $s''$, $s'''$, and $s''''$ are circuit wires or connections for one line, as shown.

Each subscriber's circuit begins, say, at the central office and passes by a wire, which I will call wire "No. $1^a$" to the subscriber's station apparatus, through the apparatus, and back to the central office by another wire, which I will call wire "No. $1^b$." One of the wires—say wire No. $1^b$—is connected to all the contact-pieces above mentioned of its switches at the different boards. The other wire passes successively through the contact-points formed by the spring-levers and their corresponding points of the switches on the different boards, passing in each case to the spring first. It then passes to the ground. If an annunciator is used to receive the calls of a line, it is preferable to place it in the circuit of the line after it has passed through the contact-points, as above, and before it passes to the ground. The lines are not connected to the ground at the subscriber's station during conversation, but may be so connected at other times.

In Fig. 2 S, S, are operators' cord systems for switching, answering, &c., subscribers' lines. Each system has pairs of double flexible cords with double or loop plugs adapted to fit into the switches and make the necessary connections. The two systems are intended to be used at two boards.

D D, &c., are the double plugs.

Y Y are switches—one for each pair of cords.

$t$ $t$ are operators' telephones.

B B are calling generators or batteries and V V are clearing-out annunciators.

$m$ $m'$ are the contact-pieces of the loop-plugs, and $n$ $n$ are the rubber insulations of the plugs.

$x$ $x$, $y$ $y$, $z$ $z$, &c., are the contact-bolts of the switches Y Y. Connections between them and various instruments are as shown.

*o o* are ground strips or plates on which the switch plugs normally rest.

Weights, as are usual, or other devices may be used to bring the plugs to normally rest on the ground plate. The cord should be of sufficient length to reach any switch of the board at which they may be placed, and all the apparatus should be conveniently mounted and placed at the board at which it is to be used. The circuits are as shown.

T T are operators' test-systems—one for each board shown. Each test-system contains a test-receiving bell, a flexible cord, and a test-plug attached to the cord, and adapted at the will of the operator to be brought into electrical connection with any of the contact pieces *j j*, at the board where it is located. B′ is a test-battery. It is connected on one side, as shown, to the test systems, and on the other side to the cord circuit of each pair of cords in the exchange.

In the subscriber's outfit shown in Fig. 3, 1 is the telephone-switch, 2 is the calling-generator, 3 is the signal receiving bell, and 4 is the subscriber's telephone. The connections are substantially as shown.

In the modification of the main line switch board and circuits the lines are not normally grounded after passing through the switches, but are open to the ground at the central office. The testing apparatus I have shown and described is applicable to both systems of main line circuits described and shown.

In the drawings I have shown but one pair of cords and plugs in each operator's system. Other pairs may be added, in ways evident to those skilled in the art. For the test-receiving instrument the operator might use a telephone or other suitable apparatus in place of the bell which is shown.

When an operator at any board desires to test a line to see whether it is in use at another board, she connects her test plug to the contact-pieces at her board of the line to be tested, and if the line is in use there will be a complete circuit through the test bell and the battery, and the test-bell will respond, and she will know that the line is already in use. The circuit can be traced as follows: From the test battery, through the test bell to the test plug, and thence through the contact-piece and the line to the switch cord, which is used in switching, and thence to the battery. If, however, the line is not switched for use, there will be no such complete circuit when the test is made and the test bell will not respond.

The general arrangement for testing herein described and shown is broadly claimed in an application for reissue of Patent No. 382,477, filed by me December 3, 1890, and the claims herein are limited to the special organizations not claimed in said application.

I claim as my invention and desire to secure by Letters Patent—

1. In a telephone exchange system, a metallic circuit-line normally grounded at the central office, a switch for said line containing two contact-pieces to which the two sides or branches of the line are respectively connected and a loop plug, with the two conductors of its double conducting-cord connected to its two contact-pieces, respectively, said plug being adapted to be inserted into said switch, and when inserted to connect its two contact-pieces with the two contact-pieces of the switch, in combination with a test-receiving instrument connected on one side to one of the conductors of said double cord and on the other side to a switch-testing device adapted to be brought into connection with a contact-piece of the line, and a battery in the circuit between the switch-testing device and the contact piece of the plug connected therewith, substantially as set forth.

2. In a telephone exchange system, metallic circuit lines, normally grounded at the central office multiple switch-boards for said lines, switches for said lines, one switch on each board, each switch containing two contact-pieces, to which the two sides or branches of the line are respectively connected, and pairs of loop-plugs at each board, each plug being adapted to be inserted into any switch and when inserted to connect its two contact-pieces with the two contact-pieces of the switch, respectively, the two contact-pieces of one plug being connected with the contact-pieces of its mate, respectively, by two conductors with flexible ends, in combination with test-receiving instruments, one at each board, each instrument being connected on one side to one of the conductors connecting each pair of cords and on its other side to a switch testing device adapted at the will of the operator to connect it with any line for testing, and a battery in the test-circuit thus established, substantially as set forth.

3. In a telephone-exchange system, metallic circuit lines, multiple switch-boards for said lines, switches for said lines, one on each board for each line, each switch containing three contact-pieces, two of which are normally in contact, and the third piece being insulated from the others, (except by the line connections) one branch of each line passing successively through the pairs of contact-pieces of its switches, which are normally connected, and from the last contact-piece to the ground, the other branch of the line being connected to said third contact-pieces of its switches on the different boards, in combination with loop-plugs, with two flexible conductors connected to the two branches of another line, said plugs being each adapted to be inserted into the switches at the boards where they are located, and when one is inserted into a switch to disconnect the pair of contact-pieces of the switch, which are normally in contact, and connect the two contact pieces of the plug with the two contact pieces of the switch which are then connected with the two branches of the line, test-receiving instruments, one at each board, each instrument being connected on one side to one of the flexible conductors of each plug and on its other side to a switch-testing device adapted at the will of the operator to be brought into connection with any of said third contact-pieces of the switches at her board, and a battery in the test-circuit thus established, substantially as set forth.

4. In a telephone exchange system, the combination with multiple switch boards, two metallic circuit lines, normally grounded at the central office, and switch devices on each board for switching any of said lines together in closed metallic circuit for conversation, of a test connection or circuit at each board, circuit connections whereby said lines are connected with one side of the test connection for each board when the lines are switched for conversation, the other side of said test connection being adapted to be brought at its board into contact with either of said lines, and a test device and battery in the test circuit completed or established at any board.

5. In a telephone exchange system, the combination with multiple switch boards, two metallic circuit lines normally grounded at the central office, and switch devices on each board for switching any two of said lines together in closed metallic circuit for conversation, of an all metallic test connection or wire for each board containing a test receiving instrument and battery, and circuit connections whereby said lines are connected with one side of the test connection for each board when the lines are switched for conversation, the other side of said test connection being adapted to be brought at its board into contact with either of said lines for testing.

6. In a telephone exchange system, the combination of multiple switch boards, two metallic circuit lines normally grounded at the central office, a switch for each line on each board, a test circuit or connection containing a test battery and test receiving instrument for each board, line switching devices and circuit connections whereby said lines may at any board be disconnected from the ground and connected together in metallic circuit for conversation and also connected with one side of the test circuit or connection of that board, and a test plug or device connected with the other side of said test connection and adapted to be brought for testing into connection with either of said lines.

7. In a telephone exchange system, metallic circuit lines, multiple switch boards for said lines, switches for said lines, one switch on each board, each switch containing two contact-pieces, to which the two sides or branches of the line are respectively connected, and pairs of loop-plugs at each board, each plug being adapted to be inserted into any switch, and when inserted to connect its two contact-pieces with the two contact pieces of the switch, respectively, the two contact pieces of one plug being connected with the contact pieces of its mate, respectively, by two conductors with flexible cords, in combination with a battery connected on one side to one of the conductors connecting each pair of plugs, and test receiving instruments, one at each board, each instrument being connected on one side to the other side of said battery and on its other side to a switch testing device adapted at the will of the operator to connect it with any line for testing.

In testimony whereof I have hereunto set my hand this 3d day of January, 1891.

MILO G. KELLOGG.

Witnesses:

EDWARD C. DAVIDSON,

M. J. KELLEY.